(12) United States Patent
Threlkeld et al.

(10) Patent No.: US 9,572,104 B2
(45) Date of Patent: Feb. 14, 2017

(54) DYNAMIC ADJUSTMENT OF USER EXPERIENCE BASED ON SYSTEM CAPABILITIES

(71) Applicant: Microsoft Technology Licensing, LLC, Redmond, WA (US)

(72) Inventors: Elizabeth Threlkeld, Redmond, WA (US); Keri Moran, Bellevue, WA (US); William S. Stauber, Seattle, WA (US); Ryan Pendlay, Bellevue, WA (US); Kenton Shipley, Woodinville, WA (US); Darren Davis, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/631,189

(22) Filed: Feb. 25, 2015

(65) Prior Publication Data

US 2016/0249289 A1    Aug. 25, 2016

(51) Int. Cl.
*H04W 52/02* (2009.01)
*G06F 9/44* (2006.01)
(Continued)

(52) U.S. Cl.
CPC ........... *H04W 52/0209* (2013.01); *G06F 8/76* (2013.01); *G06F 9/44505* (2013.01); *H04L 67/18* (2013.01); *H04W 4/02* (2013.01)

(58) Field of Classification Search
None
See application file for complete search history.

(56) References Cited

U.S. PATENT DOCUMENTS 8,254,992 B1    8/2012  Ashenbrenner et al.
8,429,699 B2    4/2013  Rodriguez et al.
(Continued)

FOREIGN PATENT DOCUMENTS

WO    2011011673 A1    1/2011
WO    2012044557 A2    4/2012

OTHER PUBLICATIONS

Park, et al., "Reconfigurable Service Composition and Categorization for Power-Aware Mobile Computing", In IEEE Transactions on Parallel and Distributed Systems, vol. 19, No. 11, Nov. 2008, pp. 1553-1564.
(Continued)

*Primary Examiner* — Diane Mizrahi
(74) *Attorney, Agent, or Firm* — Aaron Chatterjee; Dan Choi; Micky Minhas

(57) ABSTRACT

A mobile computing device has an operating system that configures the mobile computing device by defining at least one user session, wherein the at least one user session includes a plurality of contexts, each context of the plurality of contexts having separate bindings of input and output resources, and separately managed applications. For example, a different context can be associated with each display device. The operating system is further configured to receive information about applications executed in the separate contexts, to receive information about environmental conditions of the computer, and, to selectively limit operation of applications in each context according to the environmental conditions and the applications executed in both contexts.

20 Claims, 4 Drawing Sheets

(51) Int. Cl.
 G06F 9/445 (2006.01)
 H04W 4/02 (2009.01)
 H04L 29/08 (2006.01)

(56) References Cited

U.S. PATENT DOCUMENTS

| | | |
|---|---|---|
| 8,707,061 B2 | 4/2014 | Gill et al. |
| 8,713,241 B2 | 4/2014 | Borras et al. |
| 2005/0097311 A1 | 5/2005 | Gopalakrishnan et al. |
| 2006/0129861 A1 | 6/2006 | Kee et al. |
| 2008/0253079 A1 | 10/2008 | Robinson et al. |
| 2010/0081473 A1 | 4/2010 | Chatterjee et al. |
| 2010/0131691 A1 | 5/2010 | Chatterjee et al. |
| 2010/0233961 A1* | 9/2010 | Holden ................ G06F 13/385 455/41.3 |
| 2012/0023463 A1 | 1/2012 | Tseng et al. |
| 2012/0139690 A1 | 6/2012 | Gupta et al. |
| 2012/0324464 A1 | 12/2012 | Slater et al. |
| 2013/0080909 A1 | 3/2013 | Reeves et al. |
| 2013/0268935 A1 | 10/2013 | Paul et al. |
| 2014/0181715 A1 | 6/2014 | Axelrod et al. |
| 2014/0317303 A1* | 10/2014 | Toprani ............... H04L 65/1003 709/227 |
| 2016/0036949 A1* | 2/2016 | Holden ................ G06F 13/385 455/557 |

OTHER PUBLICATIONS

Korpipaa, et al., "Managing Context Information in Mobile Devices", In IEEE Pervasive Computing, vol. 2, Issue 3, Jul. 1, 2003, pp. 42-51.

"International Search Report and Written Opinion Issued in PCT Application No. PCT/US2016/018557", Mailed Date: Apr. 11, 2016, 14 Pages.

\* cited by examiner

Context 300
    Current focus 302
    User session 303
    Input devices 304
        wired or wireless 308
    Output devices 306
        wired or wireless 310
    Integrated i/o 312
    Can activate new processes 313
    Process information 314
    Idle? 315

Process list 320
    Process 322
        name 324
        status (foreground/background) 326
        in focus 327
        idle time 328
        other information 329

Data Structure 330
    device temperature 332
    ambient temperature 334
    amount of memory 336
    bandwidth utilization 338
    Available battery power 339

FIG.3

DYNAMIC ADJUSTMENT OF USER EXPERIENCE BASED ON SYSTEM CAPABILITIES

BACKGROUND

Mobile computing devices, such as smart phones, tablet computers and other small computing devices, are commonly primarily battery operated and have limited resources, in comparison to typical desktop or laptop computing devices that are not primarily battery powered. Processors in such devices may have limited instruction sets, limited memory, limited processing speed, limited input/output capability and the like, compared to their line-powered counterparts. In some uses, such mobile computing devices are connected to yet other devices, such as display devices, to provide the user with a better user experience. However, connecting multiple displays or other external input and output devices to a mobile computing device can present battery power management challenges and other resource management challenges to the operating system.

SUMMARY

This Summary is provided to introduce a selection of concepts in a simplified form that are further described below in the Detailed Description. This Summary is intended neither to identify key or essential features, nor to limit the scope, of the claimed subject matter.

A mobile computing device has an operating system that configures the mobile computing device by defining at least one user session, wherein the at least one user session includes a plurality of contexts, each context of the plurality of contexts having separate bindings of input and output resources, and separately managed applications. For example, a different context can be associated with each display device. The operating system is further configured to receive information about applications executed in the separate contexts, to receive information about environmental conditions of the computer, and, to selectively limit operation of applications in each context according to the environmental conditions and the applications executed in both contexts. Such selective limitation of operation can reduce power consumption, thus increasing battery life, and otherwise can improve resource utilization.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is a diagram of example data structures for such an operating system.

DETAILED DESCRIPTION

Figure 1:
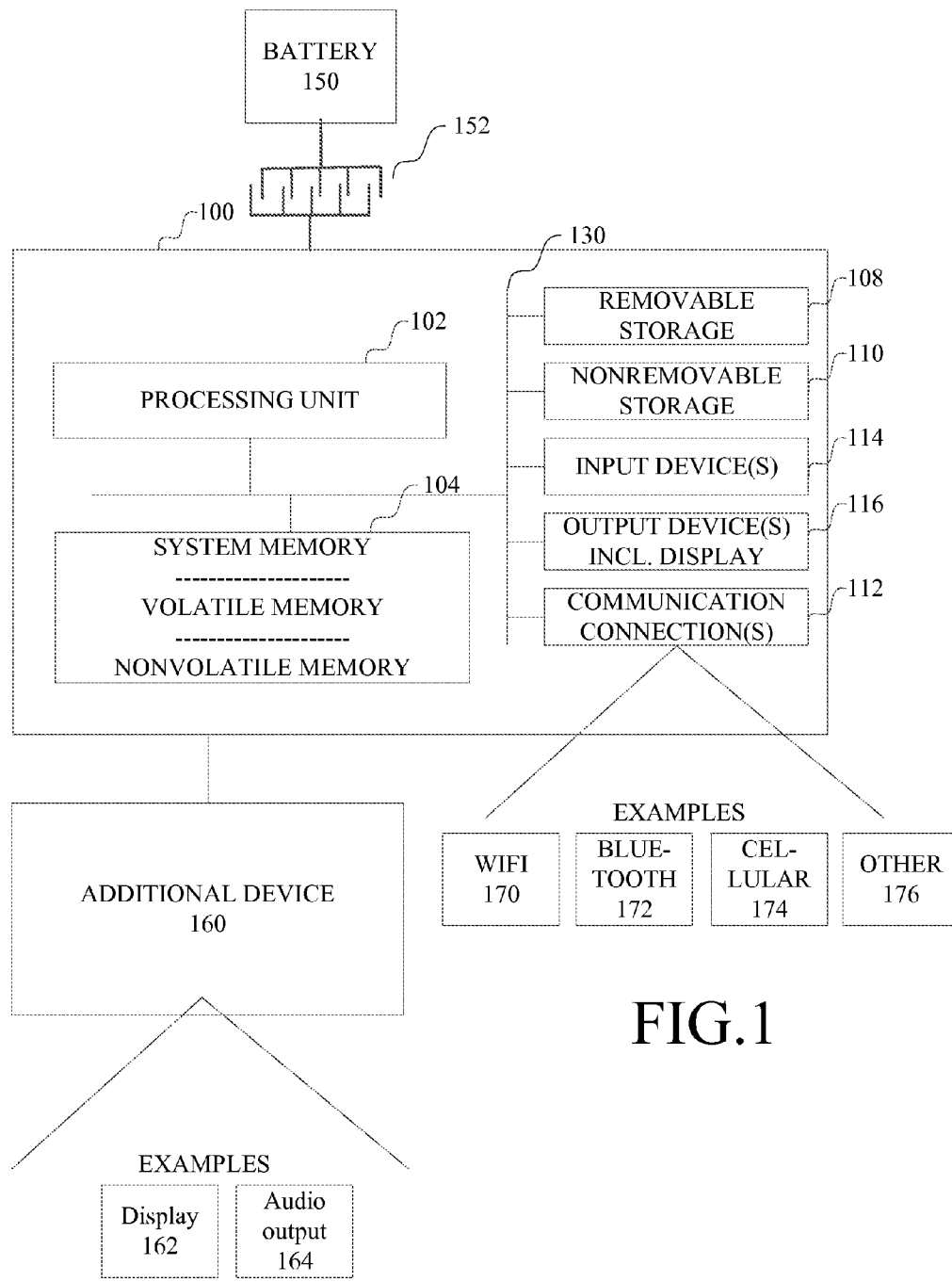
FIG. 1 is a block diagram of an example mobile computing device in which components of such a system can be implemented.

Referring to FIG. 1, an example implementation of a mobile computing device will now be described.

In FIG. 1, a mobile computing device generally incorporates a general purpose computer with computer programs providing instructions to be executed by one or more processors in the mobile computing device. Computer programs on a general purpose computer generally include an operating system and applications. The operating system is a computer program running on the computer that manages access to various resources of the computer by the applications and the operating system. The various resources generally include the one or more processors, storage (including memory and storage devices), communication interfaces, input devices and output devices.

The mobile computing device can be any type of general-purpose or special-purpose computer. A mobile computing device typically is primarily battery-powered, but can be connected to an external power source. Such a mobile computing device can have one or more wireless communication radios. Examples of such mobile computing devices include, but are not limited to, a tablet computer, hand held computer, smart phone, media player, personal data assistant, audio and/or video recorder, or wearable computing device.

FIG. 1 illustrates an example of computer hardware of a mobile computing device in which an operating system, such as described herein, can be implemented using computer programs executed on this computer hardware. The computer hardware can include any of a variety of general purpose or special purpose computing hardware configurations of the type such as described in FIG. 1.

With reference to FIG. 1, an example mobile computing device 100 includes at least one processing unit 102 and memory 104. The mobile computing device can have multiple processing units 102 and multiple devices implementing the memory 104. A processing unit 102 can include one or more processing cores (not shown) that operate independently of each other. Additional co-processing units also can be present in the mobile computing device. The memory 104 may include volatile devices (such as dynamic random access memory (DRAM) or other random access memory device), and non-volatile devices (such as a read-only memory, flash memory, and the like) or some combination of the two. Other storage, such as dedicate memory or registers, also can be present in the one or more processors. The mobile computing device 100 can include additional storage, such as storage devices (whether removable or non-removable) including, but not limited to, magnetically-recorded or optically-recorded disks or tape. Such additional storage is illustrated in FIG. 1 by removable storage device 108 and non-removable storage device 110. The various components in FIG. 1 are generally interconnected by an interconnection mechanism, such as one or more buses 130.

A computer storage medium is any medium in which data can be stored in and retrieved from addressable physical storage locations by the computer. Computer storage media includes volatile and nonvolatile memory, and removable and non-removable storage devices. Memory 104, removable storage 108 and non-removable storage 110 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Mobile computing device 100 may also include communications connection(s) 112 that allow the mobile computing device to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 112 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

In a mobile computing device, the communications connections generally include one or more radio transmitters for telephonic communications over cellular telephone networks, and/or a wireless communication interface for wireless connection to a computer network. For example, a cellular connection 170, a WiFi connection 172, a Bluetooth connection 174, and other connections 176 may be present in the mobile computing device. Such connections support communication with other devices, such as to support voice or data communications. One or more processes may be running on the processor and managed by the operating system to enable voice or data communications over such connections. Such processes generally use input and output devices, as described below, such as a microphone, speakers, display and camera. These devices typically are integrated into a housing for a mobile computing device such as a mobile phone.

The mobile computing device 100 may have various input device(s) 114 such as a touch-based input devices, pen, camera, microphone, sensors, such as accelerometers, thermometers, light sensors and the like, and so on. Output device(s) 116 such as a display, speakers, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 110, communication connections 112, output devices 116 and input devices 114 can be integrated within a housing with the rest of the mobile computing device, or can be connected through various input/output interface devices on the mobile computing device, in which case the reference numbers 110, 112, 114 and 116 can indicate either the interface for connection to a device or the device itself as the case may be.

The various components shown in FIG. 1 are primarily powered by a battery 150. This battery can be rechargeable and can be removable (as illustrated by the electromechanical connection 152). The device can connect to an external power source to power the device and/or charge the battery.

In some uses, such mobile computing devices are connected to yet other devices, such as additional device 160, such as a display 162 or audio output device 164, to provide the user with a better user experience. For example, a user may playback a movie using the mobile computing device, for which the processor of the mobile computing device decodes movie data and transmits the movie data to a connected display device for display. Connections to such devices may be made by a wired connection such as output devices 116 or through a radio connection employing WiFi 170 or Bluetooth 172 or other methods of wireless communication. The connection to the additional device 160 is not restricted to providing only display information. If so equipped the additional device 160 also can support other methods of attaching external peripheral devices to the mobile computing device 100. Connecting multiple displays or other external input and output devices to a mobile computing device in this manner can present battery power management and resource management challenges to the operating system.

With multiple input and output devices, the operating system configures the mobile computing device by defining user sessions. Each user session includes a plurality of contexts. Each context has separate bindings of input and output resources, and separately managed applications. For example, one context can include the touch screen, microphone and speakers that are integral to the mobile computing device. Another context can include a display screen and speakers of a second display device, and optionally additional input devices such as a keyboard or touch device, which are external but connected to the mobile computing device. These additional devices can be connected to the mobile computing device, for example using a Bluetooth or WiFi connection.

The operating system is configured to maintain, in computer storage media such as memory, information about applications executed in separate contexts. The operating system also is configured to receive and store information about measurable environmental conditions of the computer. The operating system also is configured to maintain, in computer storage media such as memory, information about the resources available for each of the contexts. Given this information, the operating system can selectively limit operation of applications in each context according to the received information about multiple contexts. Such selective limitation of operation can reduce power consumption, thus increasing battery life, and otherwise can improve resource utilization.

Examples of the kinds of measurable environmental conditions include, but are not limited to, the temperature of the mobile computing device, temperature of a room or environment in which the mobile computing device is being used, ambient light and any other external condition for which the mobile computing device can obtain data using a sensor. Other examples of measurable environmental conditions include internal state of the mobile computing device, such as an amount of memory and/or storage currently used, bandwidth utilization of the communication connections, and current active power consumption of applications and peripherals executing within the context, or other information about processes that the operating system can measure or track.

Examples of the kinds of information about applications include, but are not limited to, a category of the application (e.g., voice communication, video and voice communication, data communication, game with two-dimensional graphics, game with three-dimensional graphics, audio playback, video playback, etc.), and typical bandwidth utilization, typical memory consumption, typical processor utilization and typical battery consumption.

Examples of the kinds of information about each context include, but are not limited to resolution of supporting hardware and displays, how devices in each context are connected to the mobile computing device, e.g., wired or wireless, other information about the form factor of connected devices, e.g., whether input and output are integrated (e.g., a touchscreen) or separate (e.g., display and keyboard). An indication of which context is currently in focus also is useful.

With a mobile computing device supporting different contexts in a user session, there may be times at which the operating system will limit execution of processes within one or both contexts to reduce power consumption or to improve resource utilization.

For example, if a user attempts to activate an application in one context, such as videoconferencing, while another context is running an application that is consuming significant resources, such as a media player, the operating system can respond to limit execution of one or more processes. For example, the videoconferencing application can be prevented from starting, and a message can be conveyed to the user that other processes need to be stopped before that application can be started. As an example alternative, the operating system can prompt the user to stop another application before allowing the new application from starting.

In another embodiment the operating system can expose information to one or both applications requesting the applications enter into a state in which the limited resources of the mobile computing device can be more cooperatively shared. For example, the operating system can issue a request to the media player to reduce the bandwidth consumed to retrieve the media content, while the operating system also prevents the videoconferencing system from enabling a video connection. If applications fail to honor such requests from the operating system, or if, after honoring such requests, resource conflicts or power consumption are not reduced, the operating system can perform operations on these applications. Such operations can include, for example, forcefully terminating execution of one or both applications.

As another example, a drop in available battery power can be used to prompt the operating system to start reducing the number of executing processes. Similarly, other changes in the mobile computing device, such as available battery power, memory, device temperature, ambient temperature, ambient light, and the like, also can be used to prompt the operating system to start reducing the number of executing processes.

Figure 2:
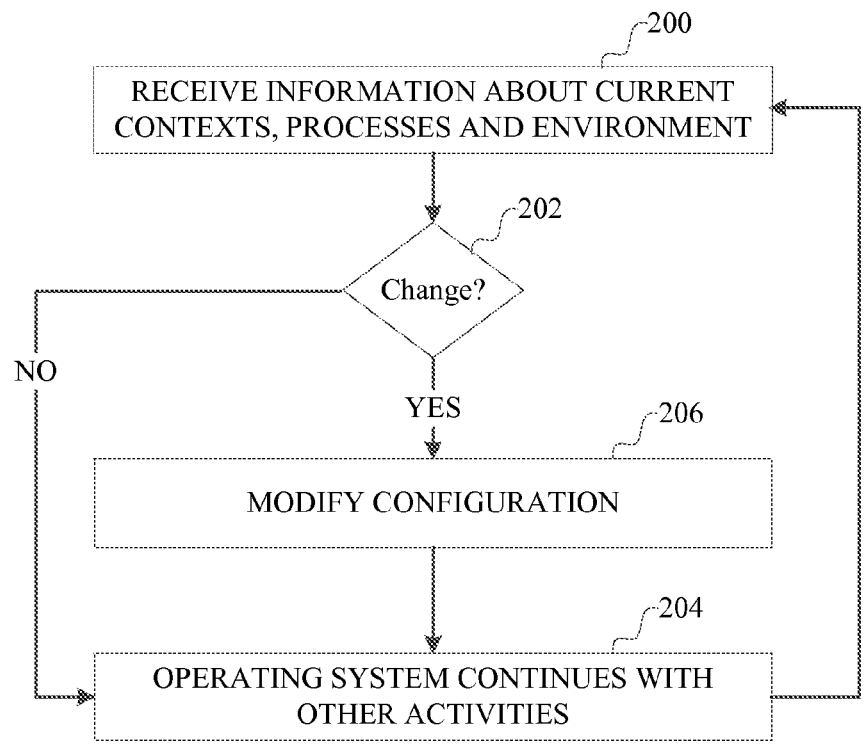
FIG. 2 a flow chart describing operation of an example implementation of an operating system of a mobile computing device.

Referring now to FIG. 2, a flowchart describing general operation of the operating system will now be described.

The operating system generally is continually receiving 200, and maintaining in a computer storage medium, information about the current contexts, processes and measurable environmental conditions. If there is no change in this information, as determined at 202, the operating system can continue 204 with other activities until it returns again to step 200.

A change in the information that is maintained by the operating system can be, for example, a change in focus from one context to another context. Such a change in the context which is in focus can occur based on user input being received through one of the input devices associated with a context. As another example, a change in the information maintained by the operating system can be the activation of a new process within a context. Such a change can affect the state of one or more contexts. Whether a new process can be activated within a context can be determined by the state of each context; this state can be checked before a new process is activated. As another example, a change in the information maintained by the operating system can occur when a process and/or a context is terminated. As another example, any change in the measured environmental conditions can result in a change in the information maintained by the operating system.

Given a change in the information maintained by the operating system, the operating system determines 206 whether to modify the configuration of the operation of the mobile computing device. A number of examples of such kinds of modifications are described in more detail below. Generally speaking, based on the current state of the changed information, contexts and processes, the operating system can cause the state of the contexts and processes to change to manage battery power consumption and otherwise to manage resource utilization. After a modification is made, the operating system can continue 204 with other activities until it returns again to step 200.

During operation of the mobile computing device with more than one context, one of the contexts is considered currently in focus. The context that is in focus is generally presumed to be the context in which a user's attention is focused. The other contexts are not in focus. Within each context, there are one or more processes or applications. A process, or application, can be operating in the foreground, which means it is visible to the end user when its context is in focus. An application in the foreground of a context that is in focus may, or may not, be in focus, meaning inputs associated with that context are directed to that process, depending on whether multiple applications are in the foreground. Other applications can be in the background, implying that the user perceives the application as being "behind" another visible or in focus application. Applications in the background may or may not be actively consuming resources, such as the processor or memory.

A change in the context which is currently in focus, or a change in the processes within the different contexts, causes a modification to the state of each context, which in turn can result in a modification of the user experience provided for each context.

Examples of how the user experience can be modified include, but are not limited to, whether current processes for a context can be foreground or must be run in the background; whether new processes can be activated in the context; whether current processes for the context can continue to run in the background or need to terminate. An example of how the state of each context can be communicated to the user can include placing a semi-transparent overlay either on a display for that context, or on a display for another context that is currently in focus, if process execution for that context is limited.

For one example, a mobile computing device can have an integrated display providing a first context, and a connected display device can provide a second context. If the mobile computing device is not capable of supporting simultaneous execution of applications in two contexts, then the operating system can create a user experience that conveys this limitation. For example, a semi-transparent overlay can be displayed on the display for one of the contexts, such as the display for the context which is currently in focus, or the display for another context which is currently not in focus, called herein the inactive context. Activating processes in the inactive context can be disabled.

As another example, a mobile computing device has an integrated display providing a first context, and a connected display device provides a second context. If an application is being executed in one of the two contexts, the ability to run the application in another context can be prevented. The operating system can create a user experience that conveys this limitation. For example, a semi-transparent overlay can be displayed on the display of one of the contexts, such as the display for the context which is currently in focus, or the display for the inactive context. If the context that is in focus is switched, and the application can be run in the context that is newly in focus, then the semi-transparent overlay can be displayed on one of the displays, such as the display of the prior, now inactive context. Alternatively, or as an additional state, the display on which the inactive context is to be presented can be placed in an idle state. Having the display in an idle state provides additional power savings by reducing the resources consumed to maintain even a semi-transparent overlay on the display for the inactive context.

As another example, a mobile computing device can have an integrated display providing a first context, and a connected display device can provide a second context. If the environmental conditions, such as battery power, device temperature, or ambient temperature, or the like, suggest that the connected display device is causing the mobile computing device to be overworked, then the second context can be disabled. Whether the system is "overworked" can be defined, for example, by setting thresholds set for various parameters, whether alone or in combination. The operating system can create a user experience that conveys this limitation. For example, a semi-transparent overlay can be displayed on the connected display device and that context can be made inactive. The operating system also can convey to the user that running of the applications in that context will be terminated. Alternatively, or as an additional state, the operating system can make the context inactive on the connected display device and inform the connected display device to enter an idle state in which the connected display device stops rendering any information from the operating system.

As another example, a mobile computing device has an integrated display providing a first context, and a connected display device provides a second context. If one of the contexts has been inactive for a long time, particularly any context associated with connected input or output devices, the operating system can initiate termination of that context. Such a condition that may occur is when a mobile computing device has been powering a connected display wirelessly for a long duration of time without the context for that display receiving focus or input. Disconnecting the display reduces battery utilization. The operating system can create a user experience that conveys this limitation. For example, a semi-transparent overlay can be displayed on the display device for the dormant context. Such an overlay can include a prompt to the user informing the user that the devices of this context will be disconnected unless the user places this context in focus by providing an input to an input device of that context. If a period of time passes without the inactive context receiving an input, then the operating system can begin terminating its applications and disconnecting from the connected devices of the context.

In an example implementation, such an operating system can maintain data structures such as shown in FIG. 3 for tracking information about contexts, processes or applications, and environmental conditions.

For example, for each context 300, the operating system can track such information as whether the context is the current focus 302 and a user session 303 (if the operating system supports multiple user sessions) with which the context is associated. Indications of each input device 304 and output device 306 associated with the context also are stored. Information about such devices, such as how the device is connected to the mobile computing device, e.g., wired or wireless 308, 310, and/or whether the input and output devices are integrated 312 or separate also can be stored. Whether new processes can be activated within this context also can be tracked, as indicated at 313. Whether a context is idle can also be stored, as indicated at 315. An idle time for a context also can be tracked and stored, or can be inferred from the idle times of its processes.

Each context 300 also can store information 314 about processes associated with that context. As an example, such information 314 can be a reference to a process list 320 maintained by the operating system for each context. For each process 322, the operating system can maintain information such as a name 324, and a status identifier 326, such as whether the process is running in the foreground or in the background. Whether a foreground application is in focus also can be stored as indicated at 327. An idle time for the process also can be stored as indicated at 328. Other data 329 about the process can be stored. Such data generally includes any data which the operating system can use to determine the user experience for each context. Examples of such data include, but are not limited to, a category for the process (e.g., voice communication, video and voice communication, data communication, game with two-dimensional graphics, game with three-dimensional graphics, audio playback, video playback, etc.), and typical bandwidth utilization, memory consumption, processor utilization and battery power consumption.

Some implementations can leverage different data stores to manage and track such information. For example, a process list may simply list the status of all processes being managed by the operating system. A separate list of context information can be maintained to describe specific context information used for actively managing the contexts. Such context lists can contain references to other information, such as a way to identify the processes in this context out of the list of all running processes on the system.

The operating system also can track information about various measurable environmental conditions, as illustrated by the data structure 330. Such information can be stored in a variety of ways within the mobile computing device, and is not restricted to being consolidated in a single data structure as shown at 330. The environmental condition information can include, for example, a current temperature 332 of the mobile computing device, current ambient temperature 334, an amount 336 of memory and/or storage currently used or currently available, bandwidth utilization 338 of the communication connections, available battery power 339, and the like. In some implementations, the environmental information can be distributed through several different components of the operating system. For example one component can be responsible for tracking ambient temperature. A secondary component can manage the amount of memory being consumed, while yet another component can track bandwidth utilization.

Given such information, the operating system can cause the contexts and processes managed by it to transition among various states so as to reduce battery power consumption and otherwise utilize resources efficiently.

In the various examples given above, an example state diagram for a context, and for a process, will now be described.

Figure 4:
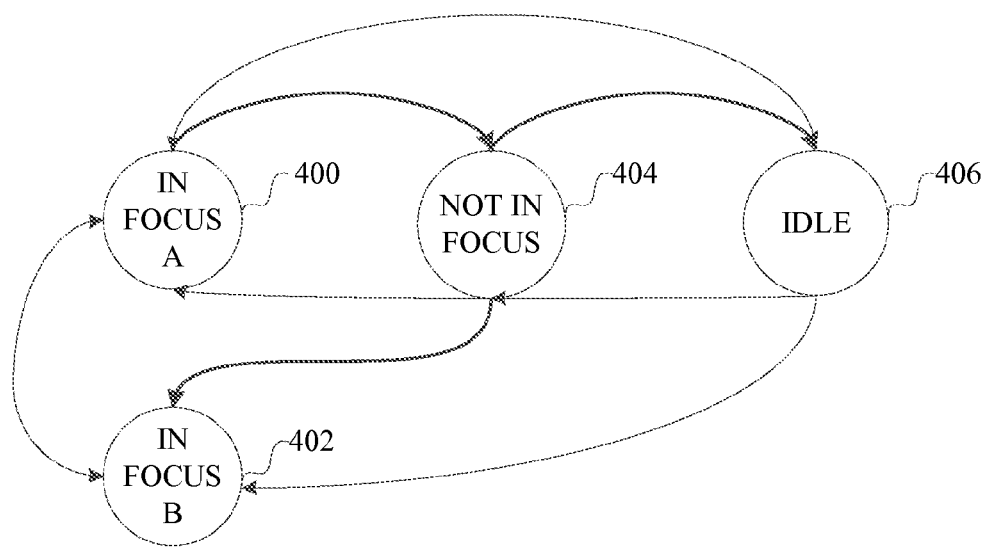
FIG. 4 is a state diagram for an example implementation of contexts.

Referring now to FIG. 4, a context can be in focus (400 or 402), or not in focus (404). When a context is in focus, it may be enabled to start (400), or disabled from starting (402), new processes. Generally, a context that is not in focus is not enabled to start new processes. The context also can be idle 406. When a context is idle, generally any processes are terminated. Power to and communication with input and output devices associated with that context also can be terminated.

Figure 5:
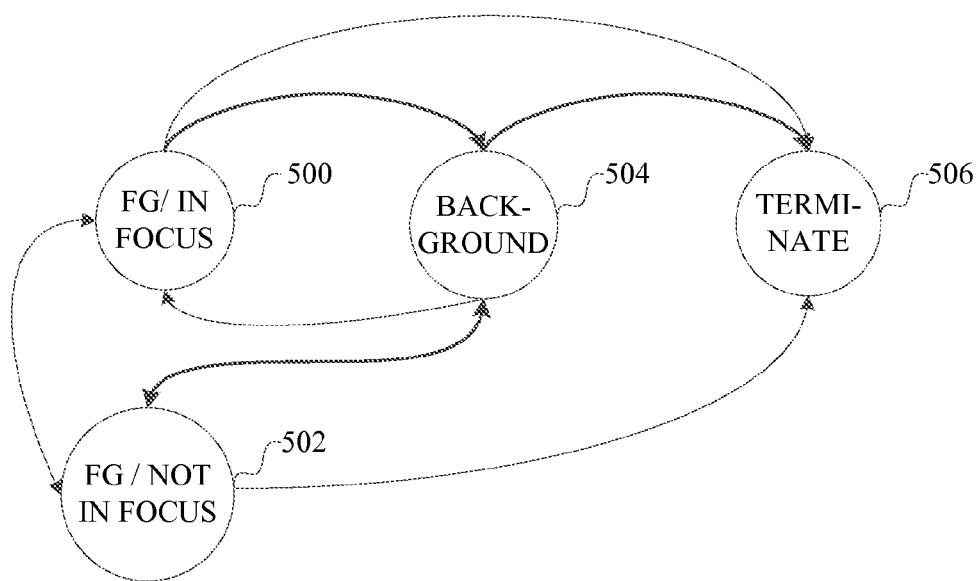
FIG. 5 is a state diagram for an example implementation of processes.

Similarly, referring now to FIG. 5, a process within a context generally can be in the foreground (500, 502) or in the background (504). When a process is in the foreground, it can be in focus (500), indicating that inputs for its corresponding context are directed to this process, or not in focus (502). Any process also can be terminated (506), which is temporary until data for the terminated process is cleaned up by the operating system.

The transitions among such states depend upon events corresponding to user inputs, and/or changes in one or more of the measured environmental conditions, information about the applications, and information about the resources of the mobile computing device. Such transitions can be defined or specified in a variety of ways, such as by using rules, conditional tests in programs, and the like, which are processed by the operating system.

With such an operating system for a mobile computing device, battery power is more efficiently utilized for those applications and components that support operations which a typical user would prefer to have continue without interruption, such as real time communication.

Accordingly, in one aspect, a mobile computing device includes a processor and storage, connected to the processor and storing computer program instructions that, when executed by the processor, provide an operating system for the mobile computing device. The mobile computing device has connections for receiving input data from input devices and for providing output data to output devices. The operating system manages access to resources of the computer by applications executed on the mobile computing device using the processor. The operating system defines at least one user session wherein the at least one user session includes a plurality of contexts, each context of the plurality of contexts having separate bindings of the input devices and the output devices. The operating system is configured to receive information about applications executed in the separate contexts and information about environmental conditions of the computer. The operating system selectively limits operation of applications in each context according to the environmental conditions and the applications executed in both contexts.

In one aspect, a mobile computing device includes a processor executing an operating system that includes means for maintaining at least one user session, wherein the at least one user session includes a plurality of contexts, each context of the plurality of contexts having separate bindings of input devices and output devices connected to the mobile device. The mobile device includes means for sensing environmental conditions of the computer. The processor executing the operating system further includes means for selectively limiting operations of application in each context according to the environmental conditions and information about the applications executed in both contexts.

In one aspect, a mobile computing device executes a process comprising: maintaining at least one user session includes a plurality of contexts, each context of the plurality of contexts having separate bindings of input devices and output devices connected to the mobile device; sensing environmental conditions of the computer; and selectively limiting operations of application in each context according to the environmental conditions and information about the applications executed in both contexts.

In any of the foregoing aspects, the operating system further can be configured to receive information about the resources available for each of the contexts.

In any of the foregoing aspects, the operating system can be further configured to prevent running an application in more than one context.

In any of the foregoing aspects, the operating system can be further configured to prevent running an application in an inactive context.

In any of the foregoing aspects, the operating system can be further configured to terminate an inactive context after a period of inactivity.

In any of the foregoing aspects, the operating system can be further configured to terminate a context associated with devices connected to the mobile computing device if the mobile computing device is overworked. A mobile computing device can be overworked, for example, if one or more measured environmental conditions exceed one or more thresholds.

In any of the foregoing aspects, the operating system can cause an overlay to be displayed on a display of an inactive context. In any of the foregoing aspects, the operating system can cause an overlay to be displayed on a display of a context that is currently in focus.

In any of the foregoing aspects, the mobile computing device can be a battery powered mobile computing device. The battery can be removable.

In any of the foregoing aspects, the mobile computer device can include a radio for supporting audio communication. The radio can provide a cellular connection. The radio can provide a WiFi connection.

In any of the foregoing aspects, the mobile computing device can be a hand held mobile computing device.

In any of the foregoing aspects, the mobile computing device can be a mobile phone.

In any of the foregoing aspects, the mobile computing device can be a tablet computer.

In any of the foregoing aspects, the mobile computing device can include a housing that encases at least the one or more processors and storage. The mobile computing device can include one or more of the following integrated with the mobile computing device within the housing: a display, a microphone, one or more speakers, one or more cameras, one or more radios for audio communication, a temperature sensor, a light sensor, an accelerometer.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Each component (which also may be called a "module" or "engine" or the like), of a computer system such as described herein, and which operates on the computer, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A mobile computing device comprising a processor, storage connected to the processor, and connections for receiving input data from input devices and for providing output data to output devices, the storage storing computer program instructions that, when executed by the processor, provide an operating system for the mobile computing device for managing access to resources of the mobile computing device by applications executed by the processor, the operating system, when executed, defining at least one user session wherein the at least one user session includes a plurality of contexts, including a first context and a second context, wherein the first context specifies a first binding of the input devices and the output devices for applications executed in the first context, and the second context specifies a second binding, different from the first binding, of the input devices and the output devices for applications executed in the second context, the operating system being configured to:
maintain information in the storage about applications executed in the first context;
maintain information in the storage about applications executed in the second context;
access information in the storage about environmental conditions of the mobile computing device; and
selectively limit operation of applications executed in the first context according to both the information about environmental conditions and the information about the applications executed in both the first context and the second context.

2. The computing device of claim 1, wherein the operating system further is configured to receive information about the resources available for each of the contexts.

3. The computing device of claim 1, wherein the operating system is further configured to prevent running an application in more than one context.

4. The computing device of claim 1, wherein the operating system is further configured to prevent running an application in an inactive context.

5. The computing device of claim 1, wherein the operating system is further configured to terminate an inactive context after a period of inactivity.

6. The computing device of claim 1, wherein the operating system is further configured mark one of the contexts as an inactive context, and further terminating use of the processor by processes in the inactive context.

7. The computing device of claim 1, wherein the operating system causes an overlay to be displayed on a display of an inactive context.

8. An article of manufacture comprising:
storage comprising at least one of a memory device or a storage device,
computer program instructions stored on the storage which, when processed by a processor of a mobile computing device, instructs the processor to provide an operating system for the mobile computing device, the operating system defining at least one user session wherein the at least one user session includes a plurality of contexts, including a first context and a second context, wherein the first context specifies a first binding of the input devices and the output devices for applications executed in the first context, and the second context specifies a second binding, different from the first binding, of the input devices and the output devices for applications executed in the second context, wherein the operating system is configured to:
receive information about applications executed in the first context;
receive information about applications executed in the second context
receive information about environmental conditions of the computer; and
selectively limit operation of applications in the first context according to both the information about the environmental conditions and the information about the applications executed in both the first context and the second context.

9. The article of manufacture of claim 8, wherein the operating system further is configured to receive information about the resources available for each of the contexts.

10. The article of manufacture of claim 8, wherein the operating system is further configured to prevent running an application in more than one context.

11. The article of manufacture of claim 8, wherein the operating system is further configured to prevent running an application in an inactive context.

12. The article of manufacture of claim 8, wherein the operating system is further configured to terminate an inactive context after a period of inactivity.

13. The article of manufacture of claim 8, wherein the operating system is further configured to terminate a context associated with devices connected to the mobile computing device in response to a determination that the mobile computing device is overworked.

14. The article of manufacture of claim 8, wherein the operating system causes an overlay to be displayed on a display of a context that is currently in focus.

15. A process performed by an operating system of a mobile computing device, the mobile computing device comprising a processor, storage connected to the processor, and connections for receiving input data from input devices and for providing output data to output devices, the storage storing computer program instructions that, when executed by the processor, provide the operating system for the mobile computing device, the operating system defining at least one user session wherein the at least one user session includes a plurality of contexts, including a first context and a second context, wherein the first context specifies a first binding of the input devices and the output devices for applications executed in the first context, and the second context specifies a second binding, different from the first binding, of the input devices and the output devices for applications executed in the second context, the operating system being configured to:
  receive information about applications executed in the first context;
  receive information about applications executed in the second context
  receive information about environmental conditions of the computer; and
  selectively limit operation of applications in the first context according to both the information about the environmental conditions and the information about the applications executed in both the first context and the second context.

16. The computing device of claim 15, wherein the operating system further is configured to receive information about the resources available for each of the contexts.

17. The computing device of claim 15, wherein the operating system is further configured to prevent running an application in more than one context.

18. The computing device of claim 15, wherein the operating system is further configured to prevent running an application in an inactive context.

19. The computing device of claim 15, wherein the operating system is further configured to terminate an inactive context after a period of inactivity.

20. The computing device of claim 15, wherein the operating system is further configured to terminate a context associated with devices connected to the mobile computing device in response to a determination that the mobile computing device is overworked.

\* \* \* \* \*